(12) United States Patent
Ganci, Jr. et al.

(10) Patent No.: US 10,237,226 B2
(45) Date of Patent: Mar. 19, 2019

(54) DETECTION OF MANIPULATION OF SOCIAL MEDIA CONTENT

(71) Applicant: International Business Machines Corporation, Armonk, NY (US)

(72) Inventors: John M. Ganci, Jr., Cary, NC (US); Sarbajit K. Rakshit, Kolkata (IN); Neil Sahota, Costa Mesa, CA (US); Craig M. Trim, Glendale, CA (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 14/953,777

(22) Filed: Nov. 30, 2015

(65) Prior Publication Data

US 2017/0155613 A1    Jun. 1, 2017

(51) Int. Cl.
*G06F 15/16* (2006.01)
*H04L 12/58* (2006.01)
*H04L 29/08* (2006.01)

(52) U.S. Cl.
CPC .......... *H04L 51/32* (2013.01); *H04L 51/12* (2013.01); *H04L 67/306* (2013.01)

(58) Field of Classification Search
CPC ....... G06F 3/0484; G06Q 50/01; H04L 51/12; H04L 51/32; H04L 65/1089; H04L 67/306
See application file for complete search history.

(56) References Cited

U.S. PATENT DOCUMENTS

| | | | |
|---|---|---|---|
| 7,788,087 | B2 | 8/2010 | Corston-Oliver |
| 9,710,829 | B1* | 7/2017 | Sitapara ............. G06Q 30/0276 |
| 2006/0200342 | A1* | 9/2006 | Corston-Oliver ..... G06F 17/274 |
| | | | 707/E17.091 |
| 2008/0120397 | A1 | 5/2008 | Hartman |
| 2011/0167115 | A1* | 7/2011 | Gilbert .................. G06Q 10/00 |
| | | | 709/204 |
| 2012/0137367 | A1 | 5/2012 | Dupont |

(Continued)

OTHER PUBLICATIONS

System and Method for Dynamic Survey Generation Based on Social Media Analysis; ip.com; Jul. 27, 2012.

(Continued)

*Primary Examiner* — Liang Che A Wang
*Assistant Examiner* — Ayele F Woldemariam
(74) *Attorney, Agent, or Firm* — George R. McGuire; Bond Schoeneck & King, PLLC; John Pivnichny (57) ABSTRACT

A method for filtering content of a social network comprising a plurality of users. The method includes the steps of: identifying one or more relationships among the plurality of users of the social network; determining a strength of each of the identified one or more relationships among the plurality of users of the social network; determining, based at least in part on a determined strength, a reputation value for one or more of the plurality of users of the social network; detecting manipulated social media content using at least one of the identified relationships, determined strengths, and reputation values; categorizing the detected manipulated social media content into one or more categories, wherein the categorization is based at least in part on a confidence level of the detected manipulation; and filtering, based at least in part on said categorization, the detected manipulated social media content.

17 Claims, 3 Drawing Sheets

(56) References Cited

U.S. PATENT DOCUMENTS

| | | | |
|---|---|---|---|
| 2012/0239763 A1* | 9/2012 | Musil | G06Q 50/01 709/206 |
| 2013/0103624 A1* | 4/2013 | Thieberger | G06N 99/005 706/12 |
| 2013/0104070 A1 | 4/2013 | Blake | |
| 2013/0124653 A1 | 5/2013 | Vick | |
| 2014/0282104 A1 | 9/2014 | Bell | |
| 2016/0378760 A1* | 12/2016 | Braz | G06Q 50/01 707/728 |

OTHER PUBLICATIONS

A Method that Optimized Long Posts Generated from Social Networking Sites; ip.com; Jun. 30, 2013.

Sudhir, U., Arrested in Andhra Pradesh for "Love You Hudhud" Facebook Post; www.ndtv.com; Oct. 30, 2015; http://www.ndtv.com/south/arrested-in-pradesh-for-love-you-hudhud-facebook-post-686278.

Parnell, B., Scientists Warn About Bias in the Facebook and Twitter Data Used in Millions of Studies; www.forbes.com; Nov. 27, 2014; http://www.forbes.com/sites/bridaineparnell/2014/11/27/scientists-warn-about-bias-in-the-facebook-and-twitter-data-used-in-millions-of-studies/.

Social Media Data Pose Pitfalls for Studying Behaviour; www.mcgill.ca; Nov. 27, 2014; http://mcgill.ca/newsroorm/channels/news/social-media-data-pose-pitfalls-studying-behaviour-240450.

Protalinski, E.; Yelp Confirms Harvard Study About Fraudulent Reviews, Says its Algorithm Discards 25% of User Submissions; www.thenextweb.com; Sep. 27, 2013; http://thenextweb.com/insider/2013/09/27/yelp-confirms-harvard-study.

Goos, G., Hartmanis, J., Lecture Notes in Computer Science; LNCS; Advances in Cryptology—CRYPTO '86; Springer-Verlag.

Biggest Rises and Falls in the 2014 World Press Freedom Index; Reporters Without Borders; Jul. 29, 2015; http://rfs.org/index2014/en-index2014.php.

Rios, M., The Geography of Tweets; Twitter Blogs; May 31, 2013; https://blog-twitter.com/2013/the-geography-of-tweets.

\* cited by examiner

DETECTION OF MANIPULATION OF SOCIAL MEDIA CONTENT

BACKGROUND

The present invention is directed to methods and systems for detecting bias, falsehoods, and manipulation in social media content, and for filtering out unwanted content to improve accuracy of social media content and the analysis of social media content.

Online social networks connect billions of people across the world. Every day, users upload millions of posts including text, audio, video, images, links, and much more. Additionally, users of these social media sites are typically free to comment on the posts of other people.

To improve the user's experience and to provide targeted advertising, content analysis software can perform semantic analysis of social networking content and provide various different types of services including advertisements, recommendations, customer behavior analysis, and more.

However, much of the content posted on social networks is manipulated, unduly biased, and/or artificial. These unwanted posts can have serious negative consequences for software analyzing social media content to provide targeted advertisements, recommendations, and customer behavior analysis.

For example, images can be staged, misleading, or unfairly biased. While posting a photo on a social network, the user will often select a photograph where the user looks especially good, or where the photograph was staged to project a visual of how the user wants to be perceived. As another example, a group of people may visit a location but due to bad weather they could not go outside, so they capture an indoor party photograph and share with a social network indicating that they are "feeling excited" when in fact they are disappointed that they can't be outside.

Social media content can also be unduly biased. Bias can come from past experience, things learned from others, relationships, and from many other sources. Often, people will provide comments that other people want to hear rather than what they truly think, which is a form of manipulation of the comment author's true sentiment.

Reputation can also be manipulated. Different people have different reputations in society or their community, and in order to give more value to users who have a good or desirable reputation level, social media posts and comments may be manipulated according to the reputation of the person on whose post the author is leaving a comment. For example, a comment author may not express his true feelings because he understands the reputation of the author of the social media content.

Another possible influencing factor for manipulating social media content is pop culture status. For example, users of a social media platform may provide overly positive or overly negative comments about a highly popular pop culture icon or trend due to the overwhelming ubiquity of the icon or trend.

Another problem with social media is fake or anonymous accounts. For example, most celebrities, companies, and organizations have social network accounts with more than one person posting comments using the same account. In this case multiple users are updating and providing comments on-behalf of the celebrities, companies, organizations. Further, many accounts are created as phishing accounts using fake or stolen identities.

Accordingly, there is a continued need in the art for systems and methods that identify and filter social media content and comments which are biased, false, or otherwise manipulated.

SUMMARY

The disclosure is directed to inventive methods and systems for accurately detecting manipulated social media feedback. Under the present invention, a system is enabled to identify social network feedback that may have been manipulated by the user. The system analyzes social network relationships and the reputation of the user who authored the identified social network feedback. In one embodiment, the system assigns a confidence level as a function of the extent to which the identified social network feedback had been manipulated. In another embodiment, the system categorizes the identified social network feedback into manipulation categories whereby a user viewing the social network feedback can filter the identified social network feedback based on the manipulation categories. In this embodiment, the manipulation categories include bias, fear, flattering, marketing, and reputation. In yet another embodiment, the system analyzes a social network relationship and its strength therein between the user who authored the identified social network feedback and another user who provided a social network content towards which the identified social network feedback was directed.

According to an aspect is a method for characterizing content of a social network comprising a plurality of users. The method includes the steps of: identifying, with a processor in communication with the social network, one or more relationships among the plurality of users of the social network; determining a strength of each of the identified one or more relationships among the plurality of users of the social network; determining, based at least in part on a determined strength, a reputation value for one or more of the plurality of users of the social network; detecting manipulated social media content using at least one of the identified relationships, determined strengths, and reputation values; categorizing the detected manipulated social media content into one or more categories, where the categorization is based at least in part on a confidence level of the detected manipulation; and filtering, based at least in part on said categorization, the detected manipulated social media content.

According to an aspect is a system for filtering content of a social network comprising a plurality of users. The system includes a processor in communication with a social network comprising a plurality of users and further comprising a plurality of social media content items. The processor is configured to: identify one or more relationships among the plurality of users of the social network; determine a strength of each of the identified one or more relationships among the plurality of users of the social network; determine, based at least in part on a determined strength, a reputation value for one or more of the plurality of users of the social network; detect manipulated social media content using at least one of the identified relationships, determined strengths, and reputation values; categorize the detected manipulated social media content into one or more categories, where the categorization is based at least in part on a confidence level of the detected manipulation; filter, based at least in part on the categorization, the detected manipulated social media content.

According to an aspect is a computer program product for characterizing content of a social network, the computer program product comprising a computer readable storage medium having program instructions embodied therewith, wherein the computer readable storage medium is not a transitory signal per se, the program instructions readable by a computer to cause the computer to perform a method. The method includes: identifying one or more relationships among the plurality of users of the social network; determining a strength of each of the identified one or more relationships among the plurality of users of the social network; determining, based at least in part on a determined strength, a reputation value for one or more of the plurality of users of the social network; detecting manipulated social media content using at least one of the identified relationships, determined strengths, and reputation values; categorizing the detected manipulated social media content into one or more categories, where the categorization is based at least in part on a confidence level of the detected manipulation; and filtering, based at least in part on said categorization, the detected manipulated social media content.

These and other aspects of the invention will be apparent from the embodiments described below.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present disclosure is directed to embodiments of a method and system for detecting bias, falsehoods, and manipulation in social media content, and for tagging and/or filtering out this unwanted content to improve accuracy of analysis algorithms. According to an embodiment, the system identifies social media or comments/feedback that may have been manipulated by the user, including manipulation through falsehoods, flattery, undue bias, and other forms of manipulation described herein. The system analyzes social network relationships and the reputation of the user who authored the identified social network feedback. In one embodiment, the system assigns a confidence level as a function of the extent to which the identified social network feedback had been manipulated. In another embodiment, the system categorizes the identified social network feedback into manipulation categories whereby a user viewing the social network feedback can filter the identified social network feedback based on the manipulation categories. In yet another embodiment, the system analyzes a social network relationship and its strength therein between the user who authored the identified social network feedback and another user who provided a social network content towards which the identified social network feedback was directed.

Figure 1:
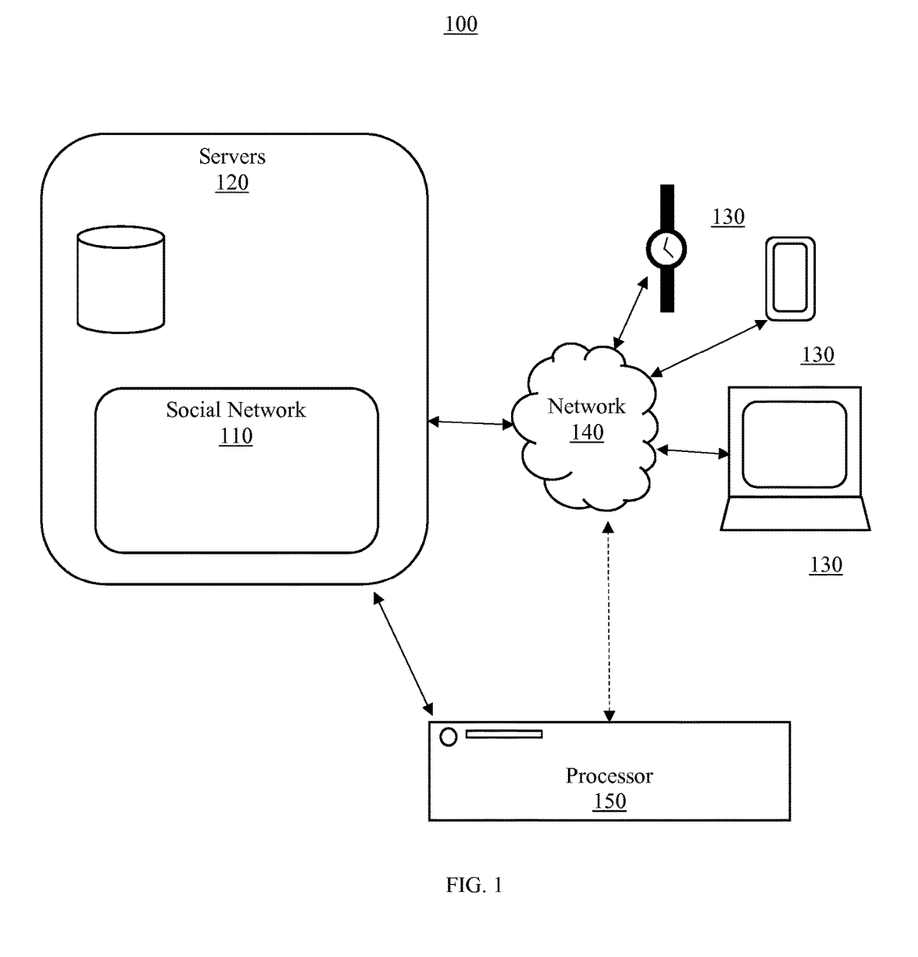
FIG. 1 is a schematic representation of a system for analyzing social network content, in accordance with an embodiment.

Referring to FIG. 1, in one embodiment, is a system 100 for detecting bias, falsehoods, and manipulation in social media content, and for tagging and/or filtering out this unwanted content to improve accuracy of analysis algorithms. According to an embodiment, system 100 comprises a social network 110, which is typically hosted on one or more servers 120 or other computers at a remote location. Social network 110 can be any of the existing social networks, or can be any new social network. Typically, a social network comprises a plurality of users who have relationship networks. The social network may comprise a system in which users extend and accept relationship requests, or may comprise a system in which relationships are automatically created between users, or may comprise a mixed system where relationships are both manually and automatically created. Typically, a social network user will utilize a computer 130 to log into the social network site via a user interface to view the relationships, to post their own content, to view the content posted by other users including users in their network, and/or to comment on or otherwise provide feedback to the content of others. Alternatively or additionally, users can access the social network through an app on their laptop, desktop, smartphone, PDA, wearable computer technology, or through any connection 130 capable of or configured for access to the social network.

The social network users will utilize a computer 130 to access the servers 120 and social network 110 remotely, and thus a wired or wireless communication network 140 exists between the user's computer 130 and the social network and servers. The wired or wireless communication network 140 can be, for example, the Internet, a LAN, Internet, cellular network, or any of a variety of other networks.

System 100 also comprises a data processing environment comprising a processor 150 configured with an algorithm to access, analyze, and optionally modify the social media content. The processor 150 can be a component of the social network 110, or can be remote from the social network 110. The algorithm comprises any of the functionality described or otherwise envisioned herein. According to an embodiment, the processor 150 receives or otherwise accesses the social media content directly or through network 140. For example, an advertiser with access to social media content may periodically or continuously access the social network through either a user interface similar to a user's user interface, or may access the social network data through a designated access point or portal. The processor and algorithm can then process the accessed data according to the methods described or otherwise envisioned herein.

Figure 2:
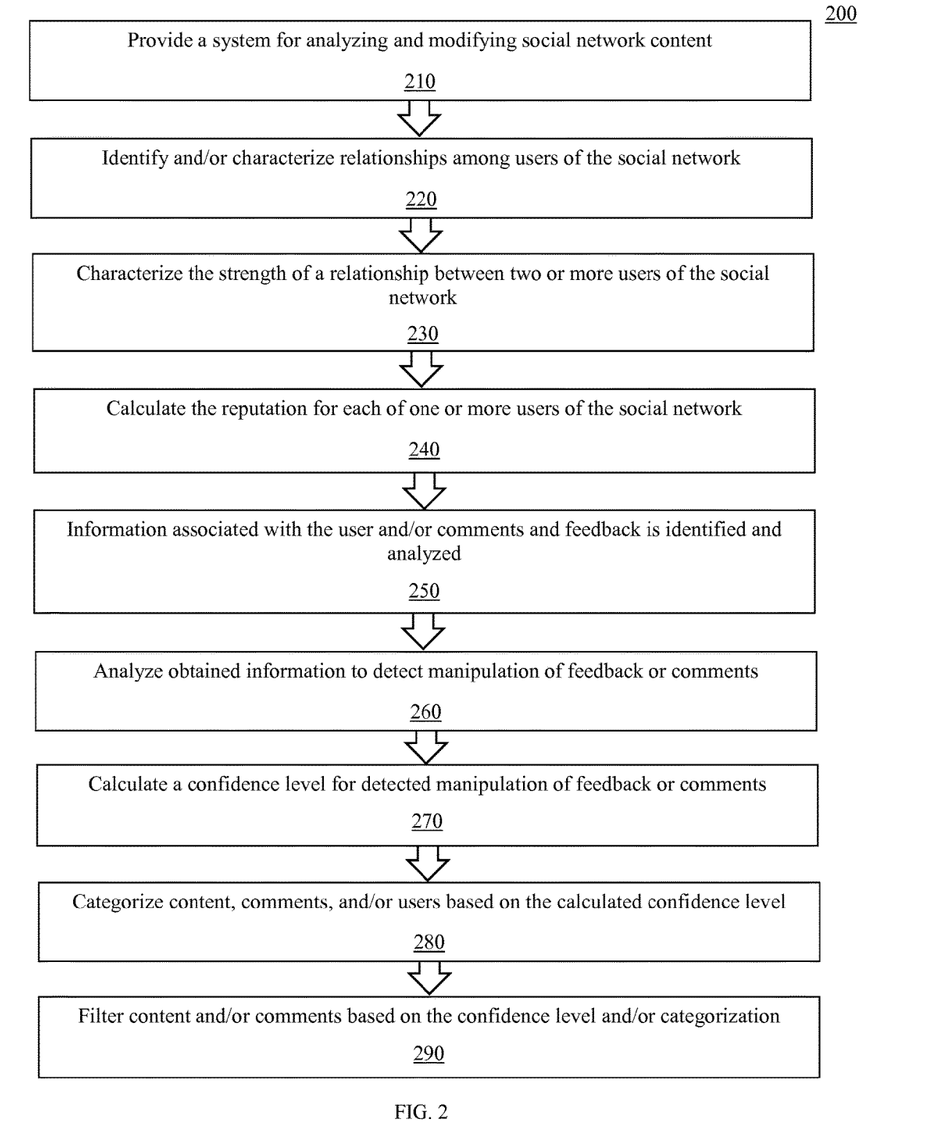
FIG. 2 is a flow chart of a method for analyzing social network content, in accordance with an embodiment.

Referring to FIG. 2, in one embodiment, is a flowchart of a method 200 for detecting bias, falsehoods, and manipulation in social media content, and for tagging and/or filtering out this unwanted content to improve accuracy of analysis algorithms. According to an embodiment, at step 210 of the method, a system 100 is provided. System 100 can comprise any of the components described or otherwise envisioned herein, including but not limited to one or more servers 120 comprising a social network 110, and a processor 150 configured with an algorithm to access, analyze, and optionally modify the social media content. Alternatively, the system may comprise only the processor 150 configured with an algorithm to access, analyze, and modify social media content at a remote location via a wired or wireless communication network 140.

As described herein, the processor 150 is configured to determine a digital independence behavioral score ("DIBS") assessment of social media content. The content analysis can then be used to determine if the content or sentiment has been manipulated, and can process and filter out the manipulated content and sentiment for improved accuracy. For example, the system determines a confidence level of the authenticity and accuracy of content posted by a user. The system can examine and filter out content based on a variety of different categories of content manipulation, such as bias, fear, flattery, marketing, reputation, visual projection of image, and many more, in order to further identify, quantify, and/or otherwise characterize the behavior of the user.

Accordingly, the algorithm will identify and flag content which has possibly been manipulated, and the algorithm will analyze the identified and flagged content in order to determine the confidence level of its authenticity and accuracy, based at least in part on aspects such as bias, fear, flattery, and others described herein or otherwise envisioned. The algorithm will analyze the manipulated content in order to identify the inherent behavior, bias, or other aspect or characterization of the user. The algorithm may also categorize the social network content based on the identified type of manipulation, which can also be used for filtering one of more types of manipulation in order to more accurately perform aggregated content analysis, and/or in order to otherwise provide more accurate content analysis.

Accordingly, at step 220 of the method, the system identifies and/or characterizes relationships among users based on the interactions between the users. Typically, relationships are a defined connection between two or more users of the social network, although relationships can be defined based on interactions between two or more users of the social network. For example, according to an embodiment, the interaction can be how frequently the users are talking with each other or leaving comments for each other, how frequently the users are responding to each other, what types of comments the users are making against each other, and a variety of other factors. Identifying a relationship can include, for example, extracting interactions from a database of interactions and labeling the interactions as a "relationship." Any interaction may constitute a relationship, while in other settings a relationship may require a minimum number of interactions, comments, posts, or other actions, including but not limited to a threshold amount of actions. Characterizing a relationship can include, for example, labeling the types of interactions between the users, or counting the number of interactions between the users, such as counting the number of interactions within a predetermined timeframe. Many other methods for characterizing a relationship using interaction data between users are possible. The relationships and interactions can be stored information in one or more databases of the social network. The system can download, access, or analyze the relationship data. In the case of downloading the relationship data, the system will comprise a database to store the data, which can be periodically updated. The data may be analyzed, condensed, or otherwise processed to be converted or adapted to a usable format. Accordingly, the identified relationship data can be completely stored on the computers or servers of the social network, can be stored entirely on the processor 150 or an associated server or database of the system, or can be stored jointly in whole or in part at both the social network and the processor 150.

At step 230 of the method, the strength of one or more of the identified relationships is determined, characterized, or otherwise analyzed. The strength of the identified relationships can be measured by, for example, the type(s) of content sharing between the members of the relationship, how positive or negative are the interactions between the members of the relationship, and/or how one member of the relationship receives interactions such as comments, responses, or other feedback from another member of the relationship. For example, the system can analyze the type(s) of content sharing between the two or more users of the identified relationship, and can perform a semantic analysis of the content to determine whether the interactions are positive, negative, or both. For example, the system may determine that User A is always flattering User B in any comments that User A leaves on User B's content. As another example, the system may determine that User A only leaves negative comments on User C's content. The system can also analyze how a user receives responses, comments, or other feedback from other users. For example, the system can analyze responses, comments, or other feedback that User B receives from users other than User A, and can compare that to the response, comments, or other feedback of User A to evaluate the deviation, likeness, and/or other aspects.

At step 240 of the method, the system calculates or determines the reputation of each of one or more users of the social network. For example, the system can determine, calculate, or otherwise create or identify a "reputation" value, tag, or category for each user of the social network. The identified reputation can be based, for example, on the relationship information obtained in one or more previous steps. Among the factors that could be considered in determining, calculating, or otherwise creating or identifying a "reputation" value, tag, or category, for example, are the following:

How popular the user is as measured by how much feedback, comments, or other responses they are receiving from different friends;

The speed of receiving responses from different people;

A semantic analysis of comments, feedback, or other responses received from friends;

How many people are recommending or following the user, such as a recommendation field in a social network platform;

Howe many different types of comments, feedback, or other responses about the user, and/or about the topic, are available in the public domain, including other media such as journals, newspapers, and/or blogs, and possibly including an analysis or categorization of whether the identified comments, feedback, or other responses about the user, and/or about the topic, are positive or negative; and Many other factors.

At step 250 of the method, information associated with the user and/or information associated with the identified comments, feedback, or other responses is identified and analyzed. For example, the system can identify associated information such as location specific information, time specific information, weather specific information, or other characteristics, data, or other information associated with the comments, feedback, or other responses. The system can also gather other user-generated data from the same location, time, or other identifying feature.

At step 260 of the method, the system analyzes the obtained information about the user, relationships, other users, associated information, and/or other factors to detect manipulation of feedback, comments, or other responses. As described or otherwise envisioned herein, manipulated feedback or comments or content can be defined, for example, as feedback or comments or content that appear to be falsehoods, subject to undue bias or flattery, or otherwise dishonest, biased, misleading, and/or distorting. As an example of manipulation is a comment that provides highly biased comment praising a product, when in fact the user who left the comment has not had a positive experience with the product or service. Another example of manipulation is a comment made by a user about a product or location that cannot be true. For example, a user may comment that she was in Puerto Rico enjoying Brand X rum when in fact Brand X rum is not sold in Puerto Rico, or when in fact she could not have been in Puerto Rico at that time.

At step 270 of the method, a confidence level is calculated. According to an embodiment, the system calculates a confidence level of manipulation, and/or for lack of manipulation, for all analyzed content. Alternatively, according to an embodiment, the system calculates a confidence level of manipulation only for content that has been identified as being manipulated. The confidence level could be determined, for example, by ranking or scoring the certainty in manipulation or lack of manipulation. Information such as past social media history, location awareness, purchase history, and a wide variety of other factors may be utilized in determining a confidence level for manipulation. As just one example, a high confidence level may be assigned to the manipulation that is evident when a user was not at a location where the user indicated they were, since this fact can be established with high confidence. As another example, a high confidence level may be assigned to the manipulation that occurs when a user indicates by a comment or other feedback that they dislike a song, but they have listened to the song many times. If the system is unable to determine the veracity or likelihood of the manipulation (or lack of manipulation) to a high degree, then the confidence level may be very low. For example, a low confidence level may be assigned to the manipulation that could possibly have occurred in the scenario where a user indicates that they like a book, but there is no record of the user purchasing or reading the book.

At step 280 of the method, the system categorizes content, feedback, comments, and/or users of the social network based on the calculated confidence level. According to an embodiment, for example, the system can flag, tag, or otherwise categorize or sort content, feedback, comments, and/or users based on the calculated confidence level. The categorization can then be stored in a database or otherwise utilized for downstream steps of the method. For example, content at or above a first confidence level can be tagged as "highly manipulated" and can be categorized as "highly manipulated." Content at or above a second confidence level can be tagged as "moderately manipulated" and can be categorized as "moderately manipulated." Content at or below a third confidence level can be tagged as "potentially manipulated" and can be categorized as "potentially manipulated." Many other categorization categories, themes, and/or systems are possible.

At step 290 of the method, the system can filter one or more categorized manipulation types, and/or can determine what is analyzed, displayed, or utilized for one or more internal or external functions based on the calculated confidence level. Filtering can include, for example, removing or highlighting a category and/or confidence level of manipulated social media content. Filtering can also include removing all social media content that appears to have been manipulated. For example, an advertiser may only access or analyze users, feedback, comments, or other content within the social network that has a low likelihood or confidence level of manipulation. As another example, an advertiser may ignore or otherwise subtract or reduce from its analysis all users, content, feedback, comments, or other content within the social network that has a high likelihood or confidence level of manipulation.

Figure 3:
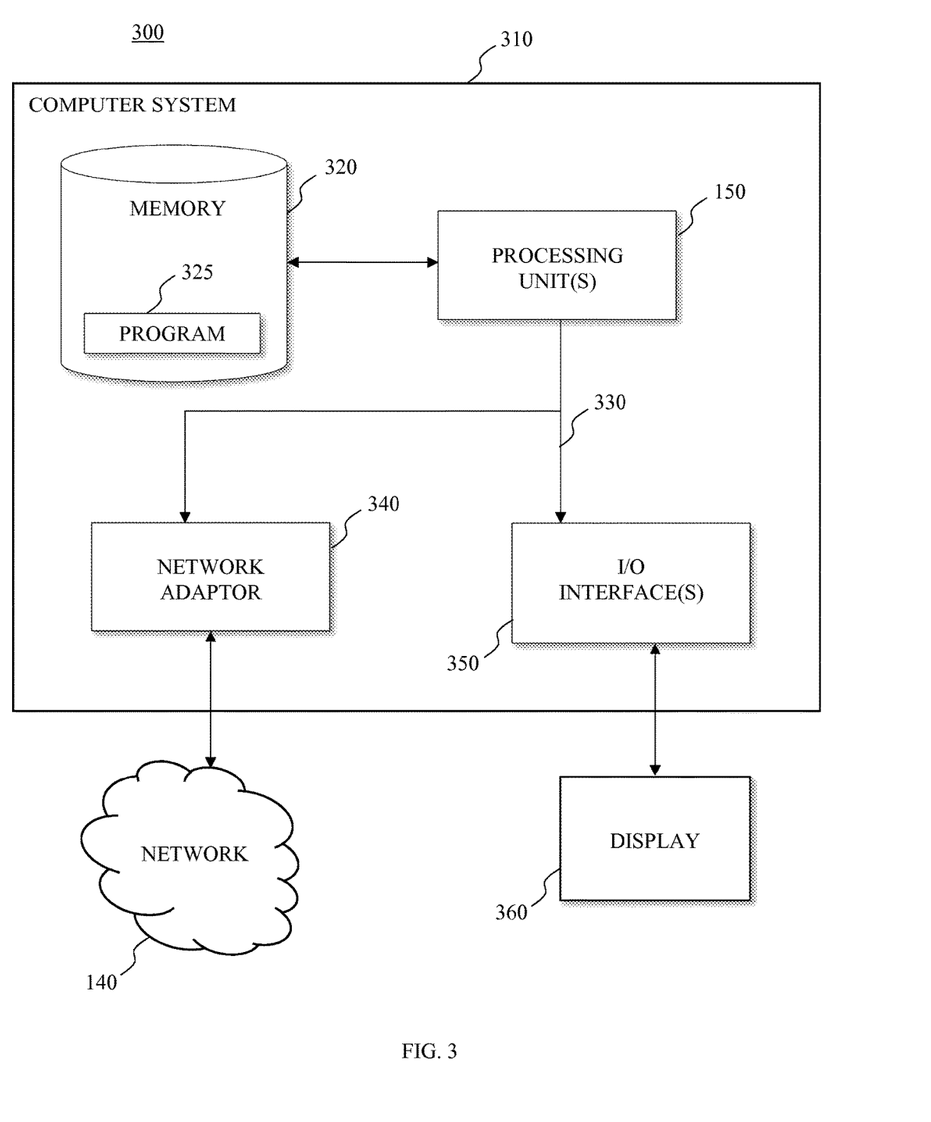
FIG. 3 is a schematic representation of a computer program product configured to analyze social network content, in accordance with an embodiment.

Referring to FIG. 3, in one embodiment, is a block diagram of components of a data processing environment, such as device 150 of FIG. 1, generally designated 300, in accordance with an embodiment of the present invention. It should be appreciated that FIG. 3 provides an illustration of just one possible implementation and does not imply any limitations with regard to the environments in which different embodiments may be implemented. Many modifications to the depicted environment may be made.

Pursuant to this embodiment, the data processing environment is shown in the form of a general-purpose computing device, such as computer system 310. The components of computer system 310 may include, but are not limited to, one or more processors or processing unit(s) 150, memory 320, and bus 330 that couples various system components including memory 320 to processing unit(s) 150, among other components. Bus 330 represents one or more of any of several types of bus structures, including a memory bus or memory controller, a peripheral bus, an accelerated graphics port, and a processor or local bus using any of a variety of bus architectures.

Computer system 310 typically includes a variety of computer system readable media. Such media may be any available media that is accessible by computer system 310, and it includes both volatile and non-volatile media, removable and non-removable media.

Memory 320 can include computer system readable media in the form of volatile memory, such as random access memory (RAM) and/or cache memory. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 330 by one or more data media interfaces. As further described herein, memory 320 may include at least one computer program product 325 having a set (e.g., at least one) of program modules that are configured to carry out the functions of embodiments of the invention. Program/utility 325, having one or more sets of program modules, may be stored in memory 320 by way of example, and not limitation, as well as an operating system, one or more application programs, other program modules, and program data. Each of the operating systems, one or more application programs, other program modules, and program data, or some combination thereof, may include an implementation of a networking environment. Program modules generally carry out the functions and/or methodologies of embodiments of the invention as described herein.

Computer system 310 may also communicate with one or more external device(s) 320, such as a keyboard, a pointing device, a display 360, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 350. Computer system 310 can communicate with one or more networks, such as a local area network (LAN), a general wide area network (WAN), and/or a public network (e.g., the Internet), among other networks, via network adapter 340. As depicted, network adapter 340 communicates with the other components of computer system 310 via bus 330. It should be understood that although not shown, other hardware and software components, such as microcode, device drivers, redundant processing units, external disk drive arrays, RAID systems, tape drives, and data archival storage systems may be used in conjunction with computer system 310.

As another example, the system may only display to users information, feedback, comments, or other content within the social network that has a low likelihood or confidence level of manipulation. A user, for example, may have access to a slider or other adjustment mechanism to determine what is displayed or available based on the assigned confidence level.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for filtering content of a social network comprising a plurality of users and a plurality of social media content associated with the plurality of users, the method comprising the steps of:
   identifying, by a processor in communication with the social network, one or more relationships among the plurality of users of the social network;
   determining, by the processor, a strength of each of the identified one or more relationships among the plurality of users of the social network;
   determining, by the processor and based at least in part on a determined strength, a reputation value for one or more of the plurality of users of the social network;
   detecting, by the processor, manipulated social media content using at least one of the identified relationships, determined strengths, and reputation values;
   determining, by the processor, a confidence level of manipulation of a manipulated social media content detected by the processor, wherein the confidence level is determined at least in part on a comparison of the manipulated social media content detected by the processor to information about one or more of the plurality of users, wherein the processor is configured to assign a high confidence level when the information about the one or more of the plurality of users contradicts the social media content, and is further configured to assign a low confidence level when the processor is unable to determine, based on a comparison to the information about the one or more of the plurality of users, a likelihood of manipulation of the social media content;
   categorizing, by the processor, the detected manipulated social media content into one or more categories, wherein the categorization is based at least in part on the determined confidence level; and
   filtering, by the processor and based at least in part on said categorization, the detected manipulated social media content,
   wherein said determining a reputation value step comprises the steps of: identifying two or more users participating in one of the identified relationships; analyzing one or more interactions between the two or more users; identifying and analyzing one or more interactions between one of the two or more users and a user of the social network other than the users participating in the identified relationship; and comparing the analysis of the one or more interactions between the two or more users to the analysis of one or more interactions between one of the two or more users and a user of the social network other than the users participating in the identified relationship.

2. The method of claim 1, wherein the one or more relationships are defined based at least in part on one or more interactions between the plurality of users of the social network.

3. The method of claim 2, wherein said strength is determined at least in part by semantic analysis of the one or more interactions.

4. The method of claim 1, further comprising the step of storing the one or more relationships, determined relationship strengths, and/or categorized manipulated social media content in a database.

5. The method of claim 1, wherein said filtering step comprises removing a category of detected manipulated social media content.

6. The method of claim 1, wherein said filtering step comprises removing all detected manipulated social media content.

7. A system for filtering content of a social network comprising a plurality of users, the system comprising:
   a processor in communication with a social network comprising a plurality of users and further comprising a plurality of social media content items;
   wherein the processor is configured to: identify one or more relationships among the plurality of users of the social network; determine a strength of each of the identified one or more relationships among the plurality of users of the social network; determine, based at least in part on a determined strength, a reputation value for one or more of the plurality of users of the social network; detect manipulated social media content using at least one of the identified relationships, determined strengths, and reputation values; determine a confidence level of manipulation of a manipulated social media content detected by the processor, wherein the confidence level is determined at least in part on a comparison of the manipulated social media content detected by the processor to information about one or more of the plurality of users, wherein the processor is configured to assign a high confidence level when the information about the one or more of the plurality of users contradicts the social media content, and is further configured to assign a low confidence level when the processor is unable to determine, based on a comparison to the information about the one or more of the plurality of users, a likelihood of manipulation of the social media; categorize the detected manipulated social media content into one or more categories, wherein the categorization is based at least in part on the determined confidence level filter, based at least in part on said categorization, the detected manipulated social media content, wherein the processor is configured to determine the reputation value through the steps of: identifying two or more users participating in one of the identified relationships; analyzing one or more interactions between the two or more users; identifying and analyzing one or more interactions between one of the two or more users and a user of the social network other than the users participating in the identified relationship; and comparing the analysis of the one or more interactions between the two or more users to the analysis of one or more interactions between one of the two or more users and a user of the social network other than the users participating in the identified relationship.

8. The system of claim 7, wherein the one or more relationships are defined based at least in part on one or more interactions between the plurality of users of the social network.

9. The system of claim 8, wherein said strength is determined at least in part by semantic analysis of the one or more interactions.

10. The system of claim 7, wherein the system further comprises a database, the database configured to store one or more of the relationships, determine relationship strengths, and/or categorized manipulated social media content in a database.

11. The system of claim 7, wherein the processor is configured to filter the social media content by removing a category of detected manipulated social media content.

12. The system of claim 7, wherein the processor is configured to remove all detected manipulated social media content.

13. A computer program product for characterizing content of a social network, the computer program product comprising a computer readable storage medium having program instructions embodied therewith, wherein the computer readable storage medium is not a transitory signal per se, the program instructions readable by a computer to cause the computer to perform a method comprising:
- identifying one or more relationships among the plurality of users of the social network;
- determining a strength of each of the identified one or more relationships among the plurality of users of the social network;
- determining, based at least in part on a determined strength, a reputation value for one or more of the plurality of users of the social network;
- detecting manipulated social media content using at least one of the identified relationships, determined strengths, and reputation values;
- determining, by the processor, a confidence level of manipulation of a manipulated social media content detected by the processor, wherein the confidence level is determined at least in part on a comparison of the manipulated social media content detected by the processor to information about one or more of the plurality of users, wherein the processor is configured to assign a high confidence level when the information about the one or more of the plurality of users contradicts the social media content, and is further configured to assign a low confidence level when the processor is unable to determine, based on a comparison to the information about the one or more of the plurality of users, a likelihood of manipulation of the social media content;
- categorizing the detected manipulated social media content into one or more categories, wherein the categorization is based at least in part on the determined confidence level; and
- filtering, based at least in part on said categorization, the detected manipulated social media content, wherein said determining a reputation value step comprises the steps of: identifying two or more users participating in one of the identified relationships; analyzing one or more interactions between the two or more users; identifying and analyzing one or more interactions between one of the two or more users and a user of the social network other than the users participating in the identified relationship; and comparing the analysis of the one or more interactions between the two or more users to the analysis of one or more interactions between one of the two or more users and a user of the social network other than the users participating in the identified relationship.

14. The computer program product of claim 13, wherein the one or more relationships are defined based at least in part on one or more interactions between the plurality of users of the social network.

15. The computer program product of claim 14, wherein said strength is determined at least in part by semantic analysis of the one or more interactions.

16. The computer program product of claim 13, further comprising the step of storing the one or more relationships, determine relationship strengths, and/or categorized manipulated social media content in a database.

17. The computer program product of claim 13, wherein said filtering step comprises removing a category of detected manipulated social media content.

* * * * *